United States Patent
Petersen

[15] 3,684,811
[45] Aug. 15, 1972

[54] PRODUCTION OF GAMMA-AMINOALKYLUREAS

[72] Inventor: Harro Petersen, Frankenthal Pfalz, Germany

[73] Assignee: Badische Anilin- & Soda-Fabrik Aktiengesellschaft, Ludwigshafen Rhine, Germany

[22] Filed: Nov. 4, 1970

[21] Appl. No.: 86,935

Related U.S. Application Data

[63] Continuation of Ser. No. 748,231, July 29, 1968, abandoned.

[52] U.S. Cl......260/256.4 C, 162/167, 260/247.2 A, 260/251 R, 260/293.86, 260/309.7, 260/70, 260/553 R, 260/553 A

[51] Int. Cl. ..................C07d 51/18, C07d 49/30

[58] Field of Search............260/256.4 C, 553, 309.7

*Primary Examiner*—Alex Mazel
*Assistant Examiner*—R. J. Gallagher
*Attorney*—Johnston, Root, O'Keeffe, Keil, Thompson & Shurtleff

[57] ABSTRACT

Production of gamma-aminoalkylureas by reaction of β-ureidopropionaldehydes with ammonia or amines and hydrogen. The products are valuable intermediates for the production of diamines, polyamines, herbicides and fungicides.

11 Claims, No Drawings

PRODUCTION OF GAMMA-AMINOALKYLUREAS

This is a continuation of U.S. Pat. application Ser. No. 748,231, filed July 29, 1968, and now abandoned.

The invention relates to the production of gamma-aminoalkylureas by reaction of β-ureidopropionaldehydes with ammonia or amines and hydrogen.

It is known from Houben-Weyl, "Methoden der organischen Chemie," 4th edition, vol. 8, p. 156, that gamma-aminoalkylureas can be prepared by reaction of 1,3-propylenediamines with potassium cyanate. The yields of the process are not satisfactory.

It is an object of this invention to provide a new process for the production of gamma-aminoalkylureas in good yields and purity starting from easily accessible substances.

This and other objects and advantages of the invention are achieved and gamma-aminoalkylureas having the general formula (I):

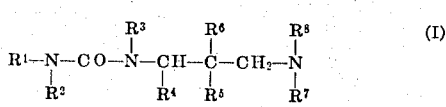

in which $R^1$, $R^2$ and $R^3$ denote identical or different aliphatic, araliphatic, cycloaliphatic or aromatic radicals, $R^4$, $R^5$, $R^6$, $R^7$ and $R^8$ denote identical or different aliphatic radicals, $R^1$ may also denote a hydrogen atom or the radical

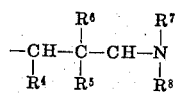

$R^3$, $R^4$, $R^7$ and $R^8$ may also denote hydrogen atoms and/or $R^2$ and $R^3$ together with the urea group may be members of a common ring or $R^1$ and $R^2$ and/or $R^7$ and $R^8$ together with the adjacent nitrogen atoms may denote a common ring are obtained advantageously by reacting a β-ureidopropionaldehyde having the general formula (II):

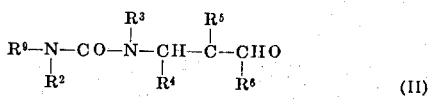

in which $R^9$ denotes a hydrogen atom, an aliphatic, araliphatic, cycloaliphatic or aromatic radical or the radical

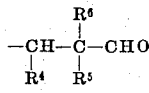

the radicals $R^2$, $R^3$, $R^4$, $R^5$ and $R^6$ have the above meanings and $R^9$ and $R^2$ together with the adjacent nitrogen atom may also denote a common ring, with ammonia or an amine having the general formula (III):

in which $R^7$ and $R^8$ have the above meanings, and hydrogen in the presence of a hydrogenation catalyst at a temperature of from 20° to 100°C, preferably from 50° to 80°C, and a pressure of from 50 to 300 atmospheres.

As compared with the said prior art method, the process according to the invention, using readily accessible starting materials, gives gamma-aminoalkylureas in higher yields and without appreciable formation of byproducts. It is surprising that this result is achieved by the process according to this invention without secondary reactions, as for example elimination of the ureido group, cyclization to 2-oxohexahydropyrimidines, or polycondensation of the β-ureidopropionaldehyde with amines, playing a part.

The β-ureidopropionaldehydes (II) used as starting materials are easily accessible in good yields by the reaction of appropriate unsymmetrically substituted ureas with formaldehyde and a CH-acid aldehyde (see U.S. Pat. application No. 661,515, filed Aug. 18, 1967, by Harro Petersen, now U.S. Pat. No. 3,551,423).

Preferred starting materials (II) and starting amines (III) and consequently preferred end products (I) are those in whose formulas $R^9$, $R^2$ and $R^3$ are identical or different alkyl, aralkyl, cycloalkyl or aryl groups each having up to twelve carbon atoms and $R^4$, $R^5$, $R^6$, $R^7$ and $R^8$ denote identical or different alkyl groups also having up to 12 carbon atoms, particularly up to four carbon atoms, or $R^9$ may denote a hydrogen atom or the radical

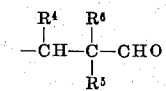

$R^4$, $R^7$ and $R^8$ may denote hydrogen atoms and/or $R^2$ and $R^3$ together with the urea group may be members of a common five-membered or six-membered ring, or $R^9$ and $R^2$ and/or $R^7$ and $R^8$ with each other together with the adjacent nitrogen atom may denote members of a common five-membered or six-membered ring.

For example the following β-ureidopropionaldehydes may be used as starting materials:
N,N-dimethylureido-N'-neopentanal,
N-methyl-N-ethylureido-N'-neopentanal,
N-benzyl-N-methylureido-N'-methyl-N'-neopentanal,
N-cyclohexyl-N-methylureido-N'-(3)-2,2-diethylpropionaldehyde,
N-morpholinoureido-N'-neopentanal,
N-piperidylureido-N'-neopentanal,
N,N-dimethylureido-N'-ethyl-N'-neopentanal,
N,N-dimethylureido-N'-(3)-2-methyl-2-ethylpropionaldehyde,
N,N'-dimethylureido-N,N'-dineopentanal,
2-oxoimidazolidine-N,N'-dineopentanal,
N-methyl-2-oxomidazolidine-N'-neopentanal,
2-oxohexahydropyrimidyl-N,N'-dineopentanal,
2-oxohexahydropyrimidyl-N-methyl-N'-neopentanal,
2-ethyl-2-butyl-3-(N-methylhexahydropyrimidyl)-propionaldehyde and
2-oxo-5,5-dimethylhexahydropyrimidyl-N,N'-dineopentanal.

Ammonia and the following primary or secondary amines are examples of starting materials which may be used: methylamine, ethylamine, isobutylamine, diethylamine, piperidine, pyrrolidine, butylmethylamine, dioctylamine.

Ammonia or a primary amine may be used in a stoichiometric amount with reference to starting material (II) or in excess, as a rule in an excess of up to 1,000 percent by weight with reference to the stoichiometric amount. They may be added in any state, for example as gaseous or liquid ammonia, and also dissolved in a solvent which is inert under the reaction conditions.

The reaction is carried out with hydrogen in the presence of a hydrogenation catalyst. The hydrogenation catalyst used is in general one or more metals having an atomic number of from 24 to 29, usually a cobalt or nickel catalyst, for example sintered catalysts, which may contain up to 30 percent by weight of copper, manganese, iron and/or chromium; Raney nickel and Raney cobalt are preferably used. The hydrogenation catalyst is used as a rule in an amount of from 0.5 to 50 percent by weight with reference to the starting material (II). Hydrogen is used in excess with reference to starting material (II). As a rule such an amount of hydrogen is supplied to the reaction mixture at the beginning and in the course of the reaction that an appropriate reaction pressure is always set up at the reaction temperature. The reaction takes place at a pressure of from 50 to 300 atmospheres, continuously or batchwise; the reaction temperature is from 20° to 100°C, preferably from 50° to 80°C. To maintain an appropriate pressure, inert gases such as nitrogen may be used in addition to hydrogen.

Solvents which are inert under the reaction conditions may be used; examples of such solvents are water, cyclic ethers such as dioxane or tetrahydrofuran, or primary or secondary alkanols having one to eight carbon atoms. They may be added to the reaction medium singly or in any mixtures, for example with one another or with a starting material. The solvent is generally used in an amount which is up to 10 times the weight of the starting materials (II).

The reaction may be carried out as follows: the β-ureido-propionaldehyde, with or without a solvent, is placed in a reactor, the hydrogenation catalyst is added and the reactor is swept with nitrogen. The amine or ammonia is then added and hydrogen is forced in until the abovementioned reaction pressure has been reached. The reaction mixture is brought to the said temperature and kept at this temperature while passing in further hydrogen until hydrogen is no longer used up by the reaction; this reaction period is generally from 2 to 3 hours. The reaction mixture is then cooled and filtered. The gamma-aminoalkylurea is separated from the filtrate by a conventional method, for example by evaporation of the filtrate and recrystallization of the residue from ether.

The compounds which can be prepared by the process according to the invention are valuable intermediates for the production of diamines, polyamines, herbicides, fungicides, and auxiliaries for the paper industry. Thus for example by condensing them into urea-formaldehyde resins in an amount of 1 to 5 percent by weight, basic resins can be prepared which can be used for bonding paper.

The invention is illustrated by the following examples. The parts given in the following examples are parts by weight.

EXAMPLE 1

A mixture of 804 parts of 2-oxohexahydropyrimidyl-N,N'-dineopentanal, 1500 parts of methanol and 100 parts of Raney nickel is placed in a stirred autoclave which is then swept with nitrogen. 500 parts of liquid ammonia is added and hydrogen is passed in, the hydrogenation being carried out at a pressure of 150 atmospheres and at 80° to 90°C for 3 hours. The mixture is then cooled and filtered. The filtrate is distilled. 770 parts of 2-oxohexahydropyrimidyl-N,N'-dineopentylamine is obtained having a boiling point of 152° to 156°C at 0.2 mm; this is equivalent to 95 percent of the theory.

| Analysis: | $C_{14}H_{30}ON_4$ | (270) | | |
|---|---|---|---|---|
| Calculated: | C 62.4% | H 11.1% | N 20.8% | |
| Found: | C 62.2% | H 11.4% | N 20.7% | |

EXAMPLE 2

A mixture of 762 parts of 2-oxoimidazolidinyl-N,N'-dineopentanal, 1,500 parts of methanol, 100 parts of Raney nickel and 600 parts of ammonia is hydrogenated in a stirred autoclave analogously to example 1 with hydrogen at a pressure of 150 atmospheres and at a temperature of from 90° to 100°C. The reaction period is 2 hours. The mixture is then cooled and filtered. The filtrate is freed from methanol by evaporation. The residue is recrystallized from ether. 710 parts of 2-oxoimidazolidinyl-N,N'-dineopentylamine (equivalent to 92.5 percent of the theory) is obtained having a boiling point of 155° to 160°C at 0.3 mm.

| Analysis: | $C_{13}H_{28}ON_4$ | (256) | | |
|---|---|---|---|---|
| Calculated: | C 61.0% | H 10.9% | N 21.9% | |
| Found: | C 60.8% | H 11.0% | N 21.7% | |

EXAMPLE 3

A solution of 804 parts of 2-oxohexahydropyrimidyl-N,N'-dineopentanal in 1,500 parts of methanol is placed in a stirred autoclave with 80 parts of Raney nickel. The autoclave is rinsed out with nitrogen, 600 parts of methylamine is forced in and hydrogenation is carried out with hydrogen at a pressure of 150 atmospheres and at a temperature of from 90° to 100°C. The aminating hydrogenation is over after 2 hours. The product is cooled and filtered and the reaction solution is evaporated and the residue obtained is distilled in a high vacuum. 780 parts of 2-oxohexahydropyrimidyl-N,N'-di-(N-methylneopentylamine) is obtained. This is a yield of 87 percent of the theory.

| Analysis: | $C_{16}H_{34}ON_4$ | (298) | | |
|---|---|---|---|---|
| Calculated: | C 64.4% | H 10.4% | N 18.8% | |
| Found: | C 64.9% | H 10.3% | N 18.8% | |

I claim:

1. A process for the production of gamma-aminoalkylureas having the general formula (I):

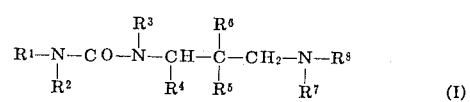

in which $R^1$, $R^4$, $R^5$, $R^6$, $R^7$ and $R^8$ may be identical or different and each denotes hydrogen or an alkyl of up to 12 carbon atoms, $R^1$ may also denote the radical:

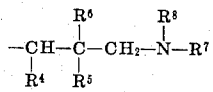

and $R^2$ and $R^3$ together with the urea group are members of a 2-oxo-hexahydropyrimidyl or 2-oxoimidazolidinyl ring and $R^7$ and $R^8$ may each, together with the adjacent nitrogen atom may be members of a 2-oxo-hexahydropyrimidyl or 2-oxoimidazolidinyl ring, wherein a B-ureido-propionaldehyde having the general formula (II):

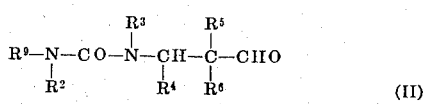
(II)

in which $R^9$ denotes a hydrogen atom or an alkyl of up to 12 carbon atoms, or the radical

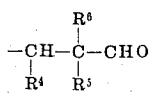

and $R^2$, $R^3$, $R^4$, $R^5$ and $R^6$ have the above meanings, is reacted with ammonia or with an amine having the general formula (III):

(III)

in which $R^7$ and $R^8$ have the above meanings, and with hydrogen in the presence of a cobalt or nickel hydrogenation catalyst at a temperature of from 20° to 100°C. and at a pressure of from 50 to 300 atmospheres.

2. A process as claimed in claim 1 wherein the reaction is carried out with ammonia or a primary amine in an excess of up to 1,000 percent by weight with reference to the stoichiometric amount.

3. A process as claimed in claim 1 wherein the reaction is carried out in the presence of an inert solvent.

4. A process as claimed in claim 1 carried out at a temperature of from 50° to 80°C.

5. A process as claimed in claim 1 carried out in the presence of a cobalt catalyst.

6. A process as claimed in claim 1 carried out in the presence of a nickel catalyst.

7. A process as claimed in claim 1 carried out in the presence of a sintered catalyst which contains up to 30 percent by weight of copper, manganese, iron and/or chromium.

8. A process as claimed in claim 1 carried out in the presence of Raney nickel.

9. A process as claimed in claim 1 carried out in the presence of Raney cobalt.

10. A process as claimed in claim 1 carried out with the hydrogenation catalyst in an amount of from 0.5 to 50 percent by weight with reference to starting material (II).

11. A process as claimed in claim 1 carried out in the presence of a solvent in an amount of up to 10 times the weight of starting material (II).

* * * * *